Oct. 23, 1923.
J. W. MADIGAN
1,471,403
CEMENT BATCH BOX, CARRIER, AND DUMP
Filed Jan. 31, 1923    3 Sheets-Sheet 1
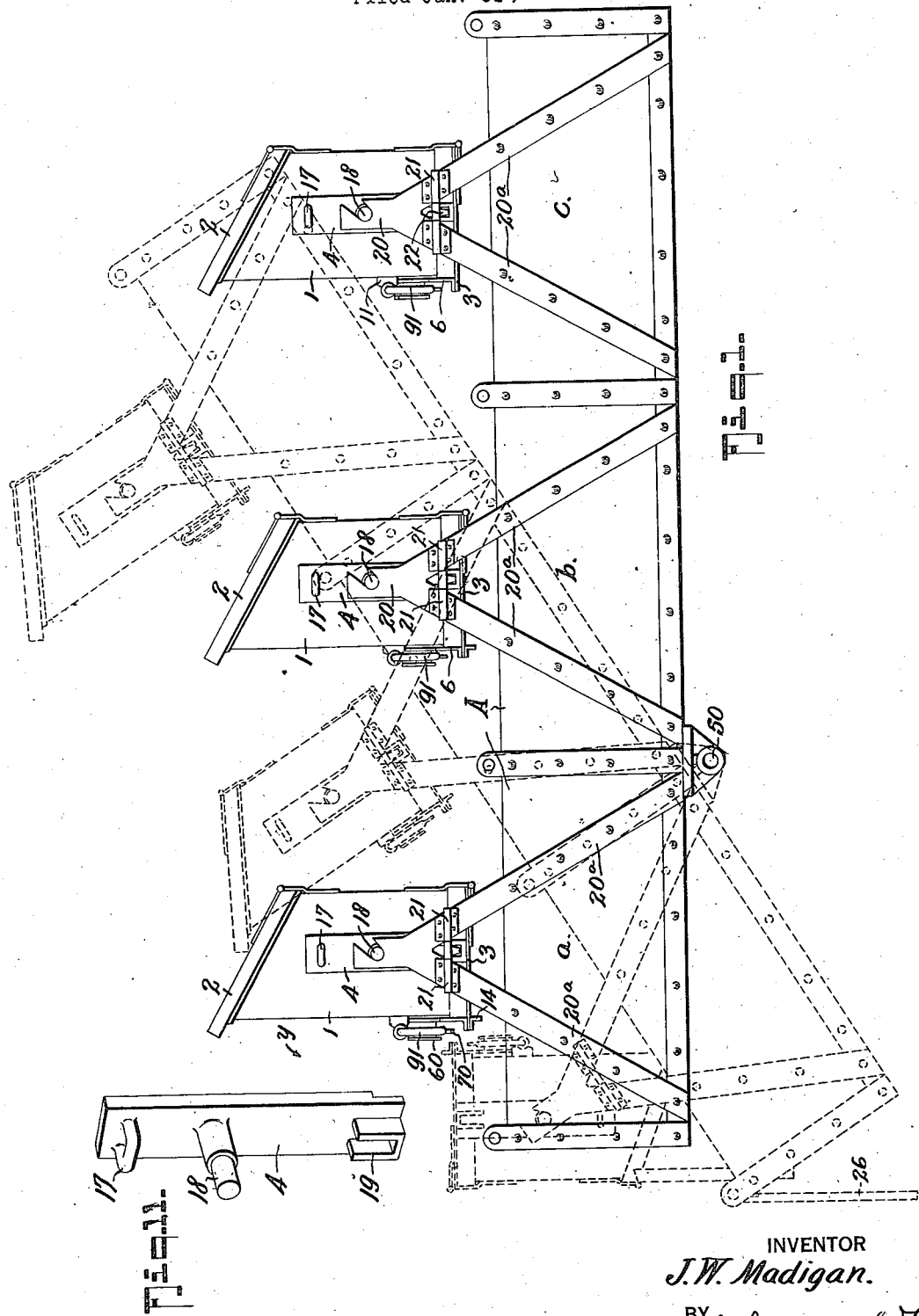
INVENTOR
*J. W. Madigan.*
BY
*Fred G. Dieterich*
ATTORNEYS Oct. 23, 1923. 1,471,403
J. W. MADIGAN
CEMENT BATCH BOX, CARRIER, AND DUMP
Filed Jan. 31, 1923  3 Sheets-Sheet 2
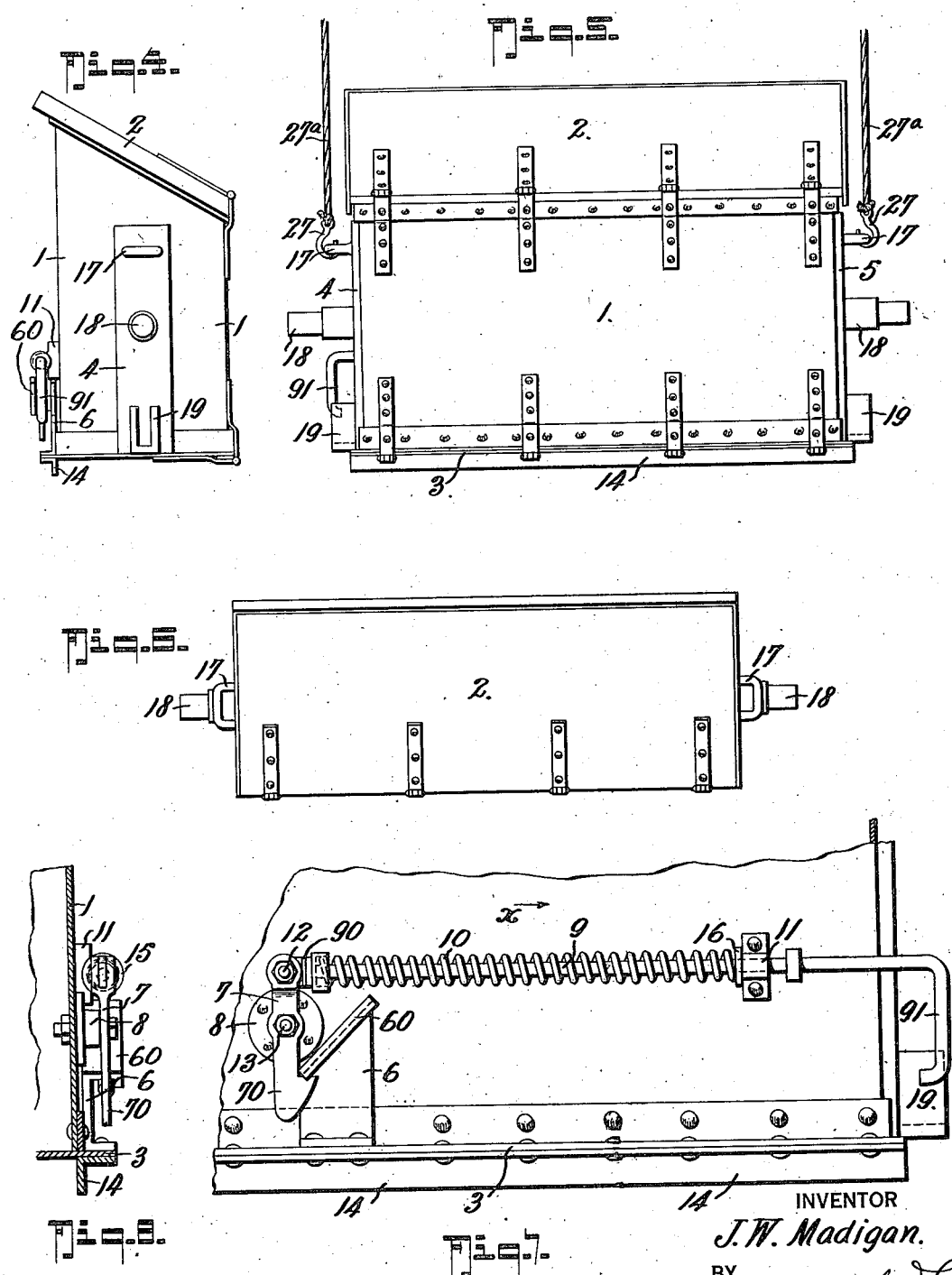
INVENTOR
J. W. Madigan.
BY
Fred G. Dieterich
ATTORNEYS Oct. 23, 1923.
J. W. MADIGAN
1,471,403
CEMENT BATCH BOX, CARRIER, AND DUMP
Filed Jan. 31, 1923   3 Sheets-Sheet 3
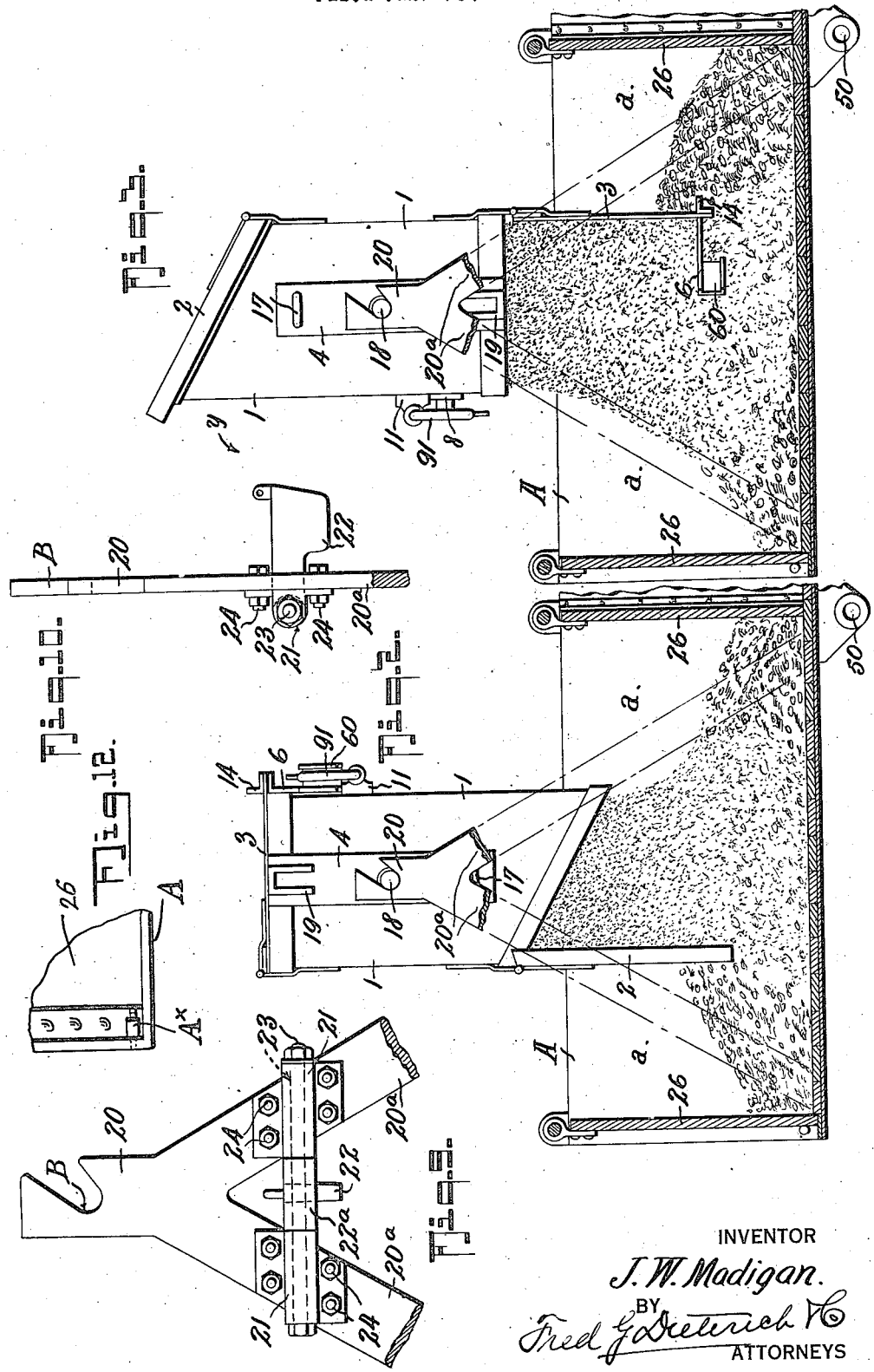
INVENTOR
J. W. Madigan.
BY
Fred G. Dieterich
ATTORNEYS Patented Oct. 23, 1923.

1,471,403

UNITED STATES PATENT OFFICE.

JOHN W. MADIGAN, OF CONNELLSVILLE, PENNSYLVANIA.

CEMENT BATCH BOX, CARRIER, AND DUMP.

Application filed January 31, 1923. Serial No. 616,120.

*To all whom it may concern:*

Be it known that I, JOHN W. MADIGAN, a citizen of the United States, residing at Connellsville, in the county of Fayette and State of Pennsylvania, have invented a new and Improved Cement Batch Box, Carrier, and Dump, of which the following is a specification.

This invention is an improved means for handling cement for concrete batch box mixers, without exposing the cement to the elements and with as little labor as possible.

Primarily the said invention has for its purpose to provide a cement handling means of the character stated of a relatively simple and inexpensive construction, by which the cement load, necessary for the batch to be mixed, can be conveniently and expeditiously transported from the cement house or car to a concrete mixer without danger of getting wet, and the cement load held in position for being readily dumped for mixing with the stone and sand that constitutes parts of the batch to be made, and the batch of cement, stone and sand held for being freely discharged (by sliding out of the end of the batch box) into the hopper of a concrete mixer.

With the above objects and other objects hereinafter mentioned in view, my invention generically comprehends an improved construction of cement receiving box, a dump truck having provision for supporting the cement box or boxes thereon in rigid relation thereto when the batch of concrete to be mixed will not require enough cement to fill the box; means being provided for inverting the concrete holding box to dump the load when the box is filled, other means being also included for locking the cement box to the upright position and for discharging the cement therein contained through the bottom of the box into the mixing compartment of the dump truck.

Subordinately my invention consists in the peculiar and novel construction of parts that constitute the cement holding and transporting box, a batch box in the nature of a dumping truck and means for supporting the loaded cement box or boxes thereon in rigid relation to the dumping truck when it is desired to deliver the cement into the batch compartment of the truck, through the bottom of the cement holding box; and other means for pivotally sustaining the said box to adapt it for being inverted and its contents dumped through the top thereof when holding a filled load, all of which will be fully stated in the following description, specifically mentioned in the appended claims and illustrated in the accompanying drawings, in which:

Figure 1 is a side elevation of an operative assembly of my complete improved means for producing and handling batches of concrete ready for being received into a concrete mixer, the several cement holding boxes being in rigid relation to the batch box or truck, the parts being shown in full lines in position for being transported to a concrete mixer and in dotted lines in position for dumping a prepared concrete batch into a concrete mixer.

Figure 2 is a longitudinal section of the outermost compartment of the batch box, the cement holding box mounted thereover being shown at the inverted position for dumping the full load of cement through the open top thereof.

Figure 3 is a view similar to Figure 2, and illustrates the cement box held for dumping its contents through the bottom thereof.

Figure 4 is an end elevation of my improved construction of cement holding box.

Figure 5 is a side elevation thereof, the lifting hooks and cables being shown in this view.

Figure 6 is a top view of the said box.

Figure 7 is a side elevation of a portion of the cement holding box and illustrates the latch mechanism that cooperates with the bottom door of the box, as hereinafter explained.

Figure 8 is a detail cross section taken on the line 8—8 on Figure 7, the latch device being shown in end elevation.

Figure 9 is a detail side elevation of one of the box supporting standards with the latch devices for holding the box rigidly thereon.

Figure 10 is a side elevation of the parts shown in Figure 9.

Figure 11 is a detail perspective view of one of the end castings for the cement holding box hereinafter further referred to.

Figure 12 is a detail elevation illustrating a common type of latch for the gates 26.

As before generally noted, my improved means for handling cement preparatory to dumping and mixing the same with the batch of sand or stone into a concrete mixer includes a cement transporting and dumping receiver or box adapted for being placed into operative position onto a combined batch holding and dumping or truck body, into which the cement is deposited from the box, discharged either through the top thereof, when carrying a filled load, or through the bottom when it is but partially filled with cement.

In the practical development of my invention, the cement holding box is of peculiar design, best shown in Figures 4, 5 and 6, from which it will be noticed the box 1, which in practice, is of heavy sheet metal, and is of a size to hold a proper amount of cement to supply the mixture for one batch of concrete.

The box 1, preferably of rectangular shape, has a straight across open bottom normally closed by a door 3 hinged to one of the long side edges of the box, to pendently swing therefrom when released from certain lock devices that hold it normally closed, and as presently further explained.

The top of the box is bevelled or inclined downwardly from the front to the rear side, as is best shown in Figure 4, and the said box top is closed by a lid 2 hinged along the lower edge of the box top to provide for dropping to the pendent open position when the box is inverted, during the operation of dumping a full batch or load of cement into the mixing compartment of the dumping trough or truck, and as is clearly illustrated in Figure 2 of the drawings.

At the opposite ends of the box, are secured castings, in the nature of elongated plates 4—5 each of which has an eye 17 for receiving the hooks 27—27 on the ends of the hanger cable $27^a$—$27^a$ that constitute parts of an overhead carrier (not shown) by which the fully or partly loaded boxes 1 are lifted and for delivering the same to their respective mixing compartments in the truck or body A.

Each casting 4 and 5 is also provided with a trunnion 18 and it should be mentioned that the opposite trunnions 18—18 are located far enough below the center of gravity of the filled cement boxes, so that the box will revert itself when lock released from its supporting standard on the mixing truck, in the manner best understood by referring to Figure 2 of the drawings and explained as follows:

The batch box or truck, designated A, is preferably divided into a plurality of compartments a—b—c, and for each of the compartments a—b—c is provided a pair of oppositely disposed standards 20—20 that include downwardly diverging lugs $20^a$—$20^a$ adapted for being attached to the outside of the trough or box A in any approved manner.

The upper end of each standard 20 extends some distance above the batch box A and terminates in a head having an open pendent slot B, the slots in the opposite standards constituting the bearings for the trunnions 18 on the boxes 1, the shape of the bearing slot B facilitating the lowering of the trunnions 18 of the cement boxes 1 into their respective sets of standards when the boxes have been carried into position for being mounted onto the said standards 20, the latter also serving to support the cement boxes in place on the batch box or truck A as the said truck is transported and positioned for dumping the concrete batches into the hopper of a concrete mixer.

One of the end castings 5, of each box 1, has a U shaped locking lug 19 adapted to receive a latch or detent 22 which includes a tubular portion $22^a$ that rockably engages a bolt 23 mounted in opposite end bearings 21 secured, by bolt and nut connections 24, to the standard 20, as is clearly shown in Figures 9 and 10, from which it will be noticed the detent or locking device 22 is located near the crotch end of the standard 20 and in position for readily dropping into or lifted out of engagement with the locking lug 19 on the box 1, it being understood that when the detent engages the said lug 19 the box is held in a relatively rigid upright position above the truck or body A when the said truck A is being transported, in order that there shall be no turning motion of the cement box until it is ready for being inverted and unloaded through the top thereof.

In the practical application of my invention, the batch box A is suitably fulcrumed on a pivot 50 located sufficiently near one end (see Figure 1) to permit of readily swinging the said box A to the dumping position, (indicated in dotted lines in said Figure 1) to thereby provide for freely sliding out the concrete batches, gathered in the several successive compartments a—b—c; the said several compartments including swinging end gates 26, in practice, latch closed by any well known means such as a spring latch bolt $A^x$, for example, so that at the start the several end gates serve as end closures for the several separate compartments of the trough, as shown.

As before mentioned, my improved construction of cement holding box is adapted, according to the load contained therein, for being emptied either through the top, when inverted, or through the bottom thereof, when it is mounted at a rigid upright position relatively to the trough A.

For controlling the dumping of the cement through the bottom of the box 1, (the box is provided with a locking and releasing mechanism for the bottom door 3) the construction of which is best shown in Figures 7 and 8. The door 3 includes an angled brace member 14 that extends along the unhinged edge of its bottom, which edge projects beyond the front side of the box 1, as is best shown in Figure 8.

On the projected end of the door 3 is secured a vertically disposed angled plate 6 whose upper end terminates in an upwardly inclined bearing flange 60, the purpose of which will presently appear and upon a pivot bolt 13, projected from a plate 8 riveted to the front side of the box 1, is fulcrumed a locking element 7 that includes a latch head 70 which cooperates with the bevelled flange 60 on the outer edge of the hinged bottom door 3.

The upper end of the locking detent 7 is bolted as at 12, to the inner flattened end 90 of a pull rod or lever 9 slidably mounted in a bearing 11 on the box 1, and the said rod 9 extends beyond one end of the box and terminates in a bent handle 91. 10 designates a compression spring mounted on the rod 9 with one end bearing against a washer 16 that engages the bearing 11. The other end engages a washer 15 that bears against the flattened end 90 of the rod, the arrangement of the several members described being such that when the latch is pulled in the direction of the arrow $x$, on Figure 7, the latch 7 will be swung from connection with the bevelled flange 60, release the door and thus permit it to drop to the pendent position shown in Figure 3, it being understood that the door at the bottom amply provides for cleaning the cement box after it is dumped or unloaded.

*Operation.*

The manner in which the mechanism shown and hereinbefore described operates is explained as follows: The lid 2 on the box 1 is turned back to provide for wholly or partly filling the box with cement. The lid 2 is then closed and owing to the inclination of the box top it sheds the water, in case of rain, and therby provides for handling the batch or load of cement without exposing it to the elements.

The lifting hooks 27–27, of an overhead carrier, are then attached to the ears 17—17 on the box 1, (see Figure 5) and through the overhead carrier the loaded box is lifted from the floor of the cement house or car, conveyed to and lowered onto the standards 20, that project above the concrete elements receiving compartment on the truck A, it being understood that the lowering of the cement box onto the opposing set of standards 20—20 is facilitated by the diagonally inclined openway bearings B—B into which the trunnions 18—18 of the box are received; it being also apparent that since the trunnions 18 are located at a point below the center of gravity of the loaded box 1 when filled, the said box normally tends to tilt in the direction of the arrow $y$ when positioned, as on Figure 1.

To hold the cement box 1 in rigid upright position relatively to the truck or portable trough A, after the box 1 has been mounted on the standards 18—18, the detent 22, before mentioned, manipulated by a lifting rope is lowered to interlock with the U shaped locking lug 19 on the box 1, and thereby sustains the said box 1 in its vertical position as the portable trough or truck A adjacent the concrete mixer is positioned to discharge a batch of aggregate and cement into the hopper of such mixer.

As before stated, the compartments $a$—$b$—$c$ of the portable trough or truck A are formed between latch equipped, pendently hinged end gates 26, and assuming the batch of stone and sand as having been placed in, say the outermost compartment $a$, the locking detent 22 is raised out of engagement with the lug 19 and the box 1 having a filled load, when released, will revolve on its trunnions (the latch 22 being now released) and invert itself, as shown in Figure 2 and dump its load of cement into the compartment $a$ of the truck A. By then releasing the front end gate 26 and tilting the truck holder A to the position indicated in dotted lines on Figure 1, the cement, together with the stone and sand, constituting a concrete batch, will slide out of the said compartment $a$ into the hopper of the concrete mixer, to be worked by such mixer.

When a plurality of compartments are formed in the truck or trough box A, as indicated in Figure 1, by unlatching their respective end gates 26 the successive compartments $b$ and $c$ are emptied of their contents in the same manner that compartment $a$ is cleared.

The bottom door 3 of the cement box 1, which provides for conveniently cleaning the said cement boxes, as before noted, also functions for dumping the cement when the batch of concrete to be mixed will not require enough cement to fill the box 1 and the said box will therefore not automatically invert itself.

For dumping the cement through the bottom of the boxes 1 after the body A has been transported adjacent a concrete mixer, into either or all of the compartments $a$—$b$—$c$, the boxes 1, mounted over their respective compartments $a$—$b$—$c$ are held locked to their upright positions by the detents 22 mentioned and the several compartments are cleared of the concrete batches contained therein in the manner explained as follows:

In order to dump the cement from the box 1, the box being at its upright position, the rod 9 is pulled out in the direction of the arrow which causes the detent 7 to turn on its pivot bolt 13 and release its head 70 from the bevelled flange 60 of the plate 6 secured to the free end of the door 3, which latter being thus released drops to a pendent position and permit the cement to discharge through the bottom of the box 1 into the compartment of the portable body A from which (the end gate of the said compartment being unlatched) the batch, as the body A is tilted, will slide out into the hopper of the concrete mixer, it being obvious that the latch devices 7 and 6 are so arranged that when the door 3 is swung upward it will force the angled flange 60 past the locking head 70 of the device 7 and cause its upper end to slightly compress the spring 10 which, as the lower edge of the flange 60 passes the hook on the head 70 due to its compression, causes the latch 7 and the member 60 to again interlock and hold the door 3 in a rigidly closed position.

My improved construction of cement holding box which provides for handling the cement from the time it leaves the cement house until it is dumped into the stone and sand batch, without exposing the same to the weather and also provides for automatically dumping a filled load by automatically inverting the box and discharging the cement through the top thereof. Further it provides for dropping quantities contained within the box and not sufficient to cause the box to turn over, through the bottom of the box by releasing and dropping the door 3, which is done through the mechanical means hereinbefore described.

From the foregoing description, taken in connection with the drawings, it is believed the complete construction, the manner of use, and the advantages of my invention will be readily apparent to those familiar with the art of concrete mixing and means for handling the cement that constitutes parts of the batches of sand, stone and cement delivered to the concrete mixture.

What I claim is:

1. A means for handling material comprising a body having a batch assembling compartment, a cement receiving box having a hinged top lid and diametrically oppositely disposed trunnions, a pair of oppositely disposed standards on said body, said standards having bearings for said trunnions to receive the same when said box is placed over the batch assembling compartment, means for holding the box in its vertical position, said box being adapted for being inverted to drop its load and discharge the cement through the top of the box into the batch assembling compartment.

2. A means for handling material comprising a body having a batch assembling compartment, a cement receiving box having a hinged top lid and diametrically oppositely disposed trunnions, a pair of oppositely disposed standards on said body, said standards having bearings for said trunnions to receive the same when said box is placed over the batch assembling compartment, means for holding the box in its vertical position, said box being adapted for being inverted to drop its load and discharge the cement through the top of the box into the batch assembling compartment, the top of said box being inclined and the lid of said box being hinged along the lowermost edge of said top.

3. A means for handling material comprising a body having a batch assembling compartment, a cement receiving box having a hinged top lid and diametrically oppositely disposed trunnions, a pair of oppositely disposed standards on said body, said standards having bearings for said trunnions to receive the same when said box is placed over the batch assembling compartment, means for holding the box in its vertical position, said box being adapted for being inverted to drop its load and discharge the same through the top of the box into the batch assembling compartment, the trunnions on said box being located at a point below the center of gravity of the box, when the latter is filled with a predetermined load of cement, whereby to adapt the cement box to automatically turn over through its top when the means for holding the box to the vertical position is adjusted to a box released position.

4. A means for handling materials comprising a body having an assembling compartment, said body including a hung end gate, means for tiltably mounting said body, a cement box, said body having bearing standards at opposite sides thereof, each having a trunnion bearing at its top, said cement box having end trunnions for engaging the bearings in said standards to support the cement box over the assembling compartment, co-engaging locking elements on the cement box and on one of the standards for holding the cement box in upright position, said cement box having a hinged drop door at the bottom, latch devices for holding said bottom door closed, manually actuated means for releasing said latch devices to drop the bottom door to provide for dumping the cement load through the bottom of the box, said body being arranged whereby when tilted the assembled batch therein will slide out through one end of the body in condition for being received into a concrete mixer.

5. A means for handling materials comprising a box in which the cement charge is received, said box having a hinged door for closing one end, a body having an assembling compartment that includes a drop hinged end gate, means for supporting said body for endwise tilting it, means for revolvably supporting the cement holding box on said body over the assembling compartment thereof, means for holding the box and said body in a relatively rigid relation, and other means for releasing the cement charge within said box to drop into the assembling compartment of said body, said body being so arranged that the contents of said assembling compartment will slide endwise under the end gate of the compartment when said body is tilted to deliver the batch into a concrete mixer.

6. In a means for handling material the combination with a body having a batch assembling compartment that includes a hinged end gate, a cement receiving box, the said box having a hinged top lid that freely drops to the open position when the box is inverted and which acts as a water shed when the box is at the vertical position, the box having oppositely disposed end trunnions and a locking element at one end, oppositely disposed standards projected from opposite sides of the batch assembling body, the said standards having externally and upwardly inclined open bearings for the reception of the end journals of the cement box, the said cement box having elements for lifting same onto and between the standards with the trunnions engaging the slotted bearings of the said standards, a drop detent on one of the standards for interlockably engaging the locking element on the box to hold the box in upright position over the assembling compartment as the body having the batch assembling compartment with the cement box are transported from place to place, the axis of the cement box being located below the center of gravity of the box when filled with a predetermined load, whereby to cause the box to discharge the cement load through the top thereof when the locking elements or connections on the box and the standards are adjusted to unlock the box from the standard.

7. In a concrete batch assembling means of the character stated, a longitudinally tiltable trough shaped body having batch receiving compartments including a plurality of swinging end gates, a cement holder having an open bottom, a door hinged on the bottom thereof to swing up and form the closure for the said bottom, manually released and spring returned latch devices for holding the door to the closed position, the said holder having a trunnion at each of its opposite ends, a pair of standards projected from the opposite sides of the batch receiving compartment of the tiltable trough shaped body, co-engaging lock devices on the cement holder and one of the standards for holding the cement holder in rigid upright position over the batch compartment to provide for dropping the cement through the bottom of the holder when the closure door for such bottom is released to hang pendent from the body of the holder.

8. In a concrete batch assembling machine of the character described, in combination with a box having a concrete batch receiving compartment and a pair of standards attached to and projected above the opposite sides of the said compartment, each of the standards having a laterally slotted bearing, of a cement holder having an open upper end that is downwardly inclined from the front to the back edge of the holder, a closure cap hinged along the lower top edge of the holder, each end of the cement holder having a trunnion, said trunnion being located below the center of gravity of the holder when filled, the holder having elements at each end for lifting it into position when loaded to engage the trunnions with the bearings on the standards of the batch mixing box and detent devices that engage one of the standards and the cement holder for sustaining the holder against swinging on its trunnions and in position for discharging the cement from the cement holder, the said holder being adapted for automatically turning over to dump its load, when the aforesaid latch devices are adjusted to release the holder from locked engagement with the standard.

9. A concrete batch assembling means comprising a longitudinally tiltable body having a batch assembling compartment, a cement receiving and holding box, the said box having a closure at the upper end the contents of the box may discharge, means for revolvably sustaining the cement holding box over the batch assembling compartment of the body, the said means including a pair of oppositely disposed standards projected vertically from the opposite sides of the batch assembling compartment of the body and trunnions on the cement holder for engaging bearings provided therefor in the upper ends of the standards for sustaining the cement holding box in rigid upright relation with respect to the body and positioned for discharging the batch produced in the said batch assembling compartment into the hopper of a concrete mixer as set forth.

10. In a concrete batch assembling means of the character described, a longitudinally tiltable body having at least one batch assembling compartment which includes a latch closed end gate pendently hinged at the upper end of the body, a cement holding box open at both ends, a gravity closed top lid that constitutes a water shed for the top of the box, an upwardly swinging door hinged to the lower end of the box and which when closed constitutes the bottom for the said cement holder, the said holder having lifting elements and oppositely disposed end trunnions, bearing standards on the body on which the cement holding box is adapted for being revolvably mounted across the batch assembling compartment of the body, manually released detent devices for holding the bottom door to the closed position when it is swung up, the aforesaid gravity dropped lid being adapted to swing to a pendent open position when the cement holding box is turned over its pivots, and detent devices cooperative with the standards and the cement holding box for holding the said box in a rigid upright position relatively to the batch assembling compartment and thereby provide for discharging the contents of the cement box through the bottom end thereof when the hinged bottom door is released to swing down from the box bottom.

11. In apparatus of the character stated, a body, means for mounting said body to be endwise tiltable, said body having a series of batch assembling compartments, a concrete box mounted on trunnions on said body over each assembling compartment, means for holding said concrete boxes against turning on their trunnions normally, means for releasing said holding means at times to permit said concrete boxes to dump their contents into the respective assembling compartments with which they are associated.

JOHN W. MADIGAN.